(12) United States Patent
Manuel

(10) Patent No.: US 7,563,091 B2
(45) Date of Patent: Jul. 21, 2009

(54) TOOL HAVING AN EJECTION ASSEMBLY, A METHOD FOR MAKING SUCH A TOOL, AND A METHOD FOR EJECTING A FORMED OBJECT FROM A TOOL

(75) Inventor: Mark Manuel, Shelby Township, MI (US)

(73) Assignee: FloodCooling Technologies, L.L.C., Bloomfield Hills, MI (US)

( * ) Notice: Subject to any disclaimer, the term of this patent is extended or adjusted under 35 U.S.C. 154(b) by 746 days.

(21) Appl. No.: 11/037,590

(22) Filed: Jan. 18, 2005

(65) Prior Publication Data

US 2006/0162142 A1 Jul. 27, 2006

(51) Int. Cl.
*A21C 11/00* (2006.01)

(52) U.S. Cl. .................. 425/424; 425/444; 164/223; 164/226; 164/227; 29/33 C

(58) Field of Classification Search .............. None
See application file for complete search history.

(56) References Cited

U.S. PATENT DOCUMENTS

| | | | |
|---|---|---|---|
| 1,539,887 A | 6/1925 | Vandergrift | |
| 3,416,766 A | 12/1968 | Miller | |
| 4,141,531 A | 2/1979 | Strausfeld | |
| 4,375,948 A * | 3/1983 | von Holdt | 425/437 |
| 4,438,867 A | 3/1984 | Mayne et al. | |
| 4,474,722 A | 10/1984 | Martin | |
| 4,532,703 A * | 8/1985 | Verhoeven et al. | 148/98 |
| 4,623,293 A | 11/1986 | Brown et al. | |
| 4,702,969 A | 10/1987 | Bunkoczy | |
| 4,746,055 A | 5/1988 | Ingram | |
| 4,755,128 A * | 7/1988 | Alexander et al. | 425/292 |
| 4,810,591 A | 3/1989 | Sakai | |
| 4,867,412 A | 9/1989 | Greune | |
| 4,946,552 A | 8/1990 | Onnie | |
| 4,997,602 A | 3/1991 | Trimble | |
| 5,031,483 A | 7/1991 | Weaver | |
| 5,032,469 A | 7/1991 | Merz | |
| 5,079,102 A | 1/1992 | Tanaka | |
| 5,106,290 A | 4/1992 | Carver et al. | |
| 5,151,167 A | 9/1992 | Truong | |
| 5,156,314 A | 10/1992 | Wallace | |

(Continued)

FOREIGN PATENT DOCUMENTS

DE 3711470 A1 10/1988

(Continued)

OTHER PUBLICATIONS

XP-000803370, Walczyk, Nov. 1998.

(Continued)

*Primary Examiner*—Gene Crawford
*Assistant Examiner*—Timothy R Waggoner
(74) *Attorney, Agent, or Firm*—Brooks Kushman P.C.

(57) ABSTRACT

A tool 100 having a forming surface 102 being formed from a contiguous material 101 and including, within the contiguous material 101 into which the forming surface 102 is operatively resident, a cylinder 150, 170 or other selectively movable member which may be selectively used to remove an object from the tool 100.

27 Claims, 4 Drawing Sheets

U.S. PATENT DOCUMENTS

| | | | |
|---|---|---|---|
| 5,156,322 A | 10/1992 | Do-Thoi et al. | |
| 5,247,861 A | 9/1993 | Jahn | |
| 5,256,496 A | 10/1993 | Kluczynski | |
| 5,273,803 A | 12/1993 | Metcalf | |
| 5,330,343 A | 7/1994 | Berteau | |
| 5,345,052 A | 9/1994 | Puddephatt | |
| 5,347,423 A | 9/1994 | deNeuf | |
| 5,372,492 A * | 12/1994 | Yamauchi | 425/139 |
| 5,377,116 A | 12/1994 | Wayne et al. | |
| 5,388,721 A | 2/1995 | Mauer | |
| 5,399,239 A | 3/1995 | Pai | |
| 5,400,946 A | 3/1995 | Weise et al. | |
| 5,421,544 A | 6/1995 | Roop | |
| 5,439,622 A | 8/1995 | Pennisi et al. | |
| 5,462,263 A | 10/1995 | Feltrin | |
| 5,529,805 A | 6/1996 | Iacovangelo et al. | |
| 5,641,448 A | 6/1997 | Yeung | |
| 5,779,833 A | 7/1998 | Cawley et al. | |
| 5,792,492 A | 8/1998 | Takahashi | |
| 5,793,015 A | 8/1998 | Walczyk | |
| 5,830,585 A | 11/1998 | Hosoe | |
| 5,847,958 A | 12/1998 | Shaikh et al. | |
| 5,869,353 A | 2/1999 | Levy | |
| 5,878,619 A | 3/1999 | Walczak | |
| 5,948,548 A | 9/1999 | Welty | |
| 6,019,143 A | 2/2000 | Marik et al. | |
| 6,024,851 A | 2/2000 | Radhakrishnan | |
| 6,025,036 A | 2/2000 | McGill | |
| 6,038,525 A | 3/2000 | Maguire | |
| 6,060,392 A | 5/2000 | Essaian | |
| 6,063,436 A | 5/2000 | Pavell | |
| 6,081,328 A | 6/2000 | Eng | |
| 6,090,207 A | 7/2000 | Knauss | |
| 6,090,507 A | 7/2000 | Grenon | |
| 6,103,402 A | 8/2000 | Marcin, Jr. | |
| 6,109,332 A | 8/2000 | Sachs | |
| 6,113,752 A | 9/2000 | Hollstein | |
| H1933 H | 1/2001 | Zabinski | |
| 6,355,331 B2 | 3/2002 | Hillier | |
| 6,391,473 B2 | 5/2002 | Numakura | |
| 6,401,001 B1 | 6/2002 | Jang et al. | |
| 6,472,029 B1 | 10/2002 | Skszek | |
| 6,495,272 B1 | 12/2002 | Creber et al. | |
| 6,627,835 B1 | 9/2003 | Chung | |
| 2002/0175265 A1 | 11/2002 | Bak et al. | |
| 2004/0128016 A1 | 7/2004 | Stewart | |

FOREIGN PATENT DOCUMENTS

| | | |
|---|---|---|
| EP | 0 775 550 A1 | 5/1997 |
| EP | 1 216 806 A2 | 6/2002 |
| GB | 38370/73 | 8/1973 |
| JP | 58-091123 | 5/1983 |
| WO | WO 8707538 | 12/1987 |
| WO | WO 88/07932 | 10/1988 |
| WO | WO 95/08416 | 3/1995 |
| WO | WO 01/70450 A1 | 9/2001 |
| WO | WO 03/043795 | 5/2003 |

OTHER PUBLICATIONS

A New Rapid Tooling Method For Sheet Metal Forming Dies- D. Walczyk.
International Search Report and Written Opinion for corresponding International Application No. PCT/US05/45956, mailed May 7, 2007, 8 pages.
International Preliminary Report On Patentability for corresponding International Application No. PCT/US2005/045956, mailed Aug. 2, 2007, 5 pages.

* cited by examiner

TOOL HAVING AN EJECTION ASSEMBLY, A METHOD FOR MAKING SUCH A TOOL, AND A METHOD FOR EJECTING A FORMED OBJECT FROM A TOOL

FIELD OF THE INVENTION

The present invention generally relates to a tool having an ejection assembly, a method for making such a tool, and a method for ejecting a formed object from the tool and more particularly, to a new and novel tool and tool formation strategy which allows a formed object to be quickly removed from the tool while substantially reducing the likelihood of damage to the object and which overcomes current deficiencies and drawbacks associated with current techniques and strategies.

BACKGROUND OF THE INVENTION

A tool is used to selectively form or create an object. It should be realized, at the outset, that the term "tool", as used throughout this description, is meant to refer to any device, assembly, and/or tangible entity which is adapted to be selectively used to form or create substantially any sort of object and that nothing in this description is meant to (or should be construed as) limiting the tool to that which produces a certain object or a certain class or group of objects.

Typically, a tool is formed from a substantially solid block of material (e.g., the tool is "cut" from, machined from, and/or burned from the block of material). While this traditional approach does allow a tool to be created, it is costly and highly inefficient. Particularly, this cost and inefficiency increases in direct proportion to the size of the desired tool.

Another approach to creating a tool is found within U.S. Pat. No. 6,587,742 ("The '742 patent") which issued on Jul. 1, 2003, which is assigned to Applicant's assignee, and which is fully and completely incorporated herein by reference, word for word and paragraph for paragraph.

The foregoing approach is oftentimes referred to as a "lamination strategy or technique" and involves the initial creation of a "soft model" (i.e., a model which is manifested within software) of the tool, and the later use of this soft model to form-several sectional members which are later physically coupled and cooperatively form the desired tool. This technique dramatically reduces the cost and increases the overall efficiency of the tool creating process.

One of the common features of each of the foregoing diverse strategies involve the need for ejecting the formed object from the tool. Typically each of these diverse approaches utilizes a separate ejection assembly which is operatively placed below the tool and below the formed object. The ejection assembly typically includes several selectively extendable pins or members which selectively extend through openings which are formed within the tool and selectively contact the formed object in order to forcibly disengage the formed object from the tool.

While such an ejection assembly does usually or normally forcibly eject the formed object from the tool, it suffers from several disadvantages. By way of example and without limitation, this traditional ejection assembly includes a relatively large number of components which must be produced and assembled to very accurate tolerances, thereby undesirably increasing the overall cost and time of production. Further, due to the relatively large amount of moving members, this traditional ejector assembly is prone to jamming and breakage and requires a relatively large amount of repair and preventative type of maintenance, thereby further undesirably increasing the overall cost of production. Further, the speed or force of impact of the selectively expandable members against the formed part is not regulated, thereby increasing the likelihood of undesired damage to the formed object (especially of objects which are formed from a relatively soft material) and the improper retraction of these movable elements may cause damage to the tool. Further, these movable elements or pins are typically received by and traverse an ejector plate before entering the tool. Typically the ejector place typically causes a side or deforming load to be placed upon or imparted to the movable elements, thereby causing these movable elements to frictionally and respectively engage the sides of the tool openings that they respectively traverse as they selectively engage the formed object, thereby undesirably causing these openings to be wearably modified and the tool to be damaged. Each of these foregoing difficulties is made to be even more pronounced or magnified by the traditional need to "operatively marry" a separately produced tool and a separately produced ejector assembly, each of which typically represents a complicated assembly which must be produced and operated in accordance with very close or "tight" tolerances.

There is therefore a need for a new and improved tool assembly, a method for making a tool assembly, and a method for ejecting a formed object from a tool assembly which overcomes some or all of the previously delineated drawbacks of prior techniques and the present invention achieves these advantages.

SUMMARY OF THE INVENTION

It is a first non-limiting aspect of the present invention to provide a tool which overcomes some or all of the previously delineated disadvantages of prior tools.

It is a second non-limiting aspect of the present invention to provide a method for making a tool which overcomes some or all of the previously delineated disadvantages of prior tools.

It is a third non-limiting aspect of the present invention to provide a method for ejecting an object from a tool which overcomes some or all of the previously delineated disadvantages of prior tools.

According to a first non-limiting aspect of the present invention, a tool is provided and includes a contiguous mass of material having an object forming surface therein; and at least one member which is movably and operatively disposed within the contiguous mass of material and which is adapted to move within the contiguous mass of material from a first position which is remote from the object forming surface to a position through the object forming surface.

According to a second non-limiting aspect of the present invention, a method of forming a tool is provided and includes the steps of forming an intangible design of the tool of the type having a forming surface; using the intangible design to create a plurality of sectional members; coupling the sectional members, effective to form a tool having the forming surface; forming a housing space within the formed tool; and operatively placing a selectively movable member within the housing space which is adapted to be selectively moved through the forming surface.

According to a third non-limiting aspect of the present invention, a method of ejecting a formed object from a tool is provided and includes the steps of placing a movable member within the tool; selectively vibrating the movable member as the movable member contacts the formed object, thereby ejecting the formed object from said tool.

According to a fourth non-limiting aspect of the present invention, a tool is provided and includes an object ejector assembly; and a vibration assembly which is operatively coupled to the object ejector assembly and which causes the object ejector assembly to vibrate, effective to remove an object from the tool.

According to a fifth non-limiting aspect of the present invention, a tool having an integrally formed ejector assembly is provided.

These and other features, aspects, and advantages of the present invention will become apparent from a reading of the detailed description of the preferred embodiment of the invention, including the subjoined claims, and by reference to the following drawings.

DETAILED DESCRIPTION OF THE PREFERRED EMBODIMENT OF THE INVENTION

Figure 1:
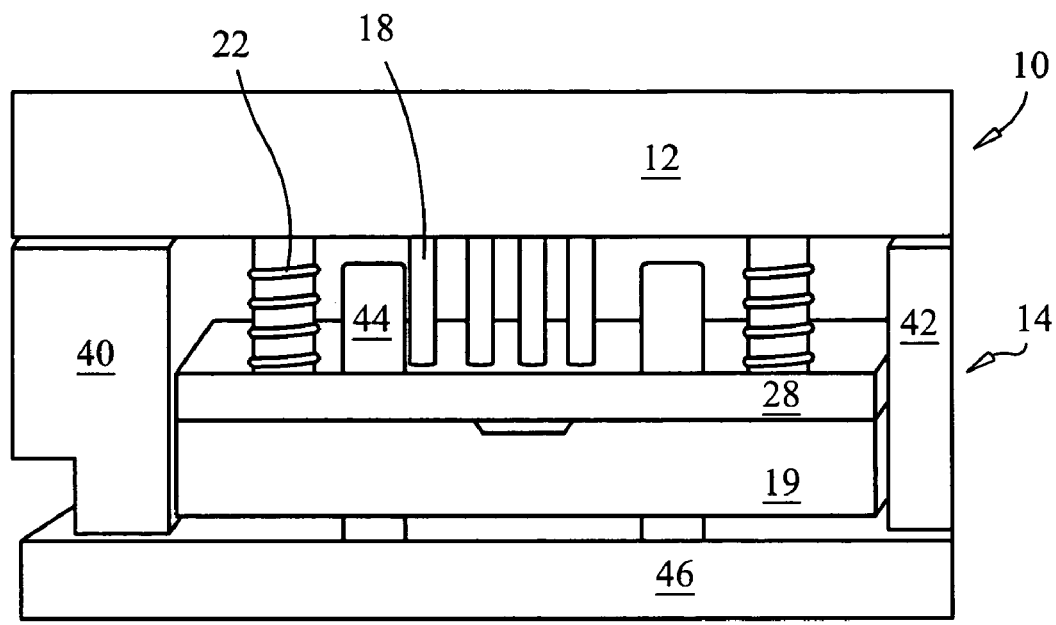
FIG. 1 is partial side view of a tool assembly made in accordance with the teachings of the prior art.

Referring now to FIGS. 1-5, there is shown a tool assembly 10 which is generally made in accordance with the prior art, but which may be used in a new or novel manner. Particularly, the tool assembly 10 includes a tool 12 which may be made according to the teachings of The '742 patent or which may be made according to such undesirable tool formation strategies as being cut or formed from a substantially solid block of material (i.e., by traditional tool formation strategies or techniques). As will be apparent from reading this description, even the traditional tool assembly 10 may be utilized in a new and novel manner to overcome some of the above-noted drawbacks, even if the tool assembly 10 is not modified or replaced in accordance with the teachings of the preferred embodiment of the invention. Moreover, the tool 12 is meant to generally refer to substantially any desired tool and is not limited to a particular type of tool, and includes an object forming surface 13 which is used to form substantially any desired object or tangible item, such as item 80. The tool assembly 10 further includes an ejection assembly or object ejector assembly 14 which is generally adapted to selectively remove or "force out" a formed part from the tool 12 and which structurally corresponds to a traditional type of ejection assembly.

Figure 4:
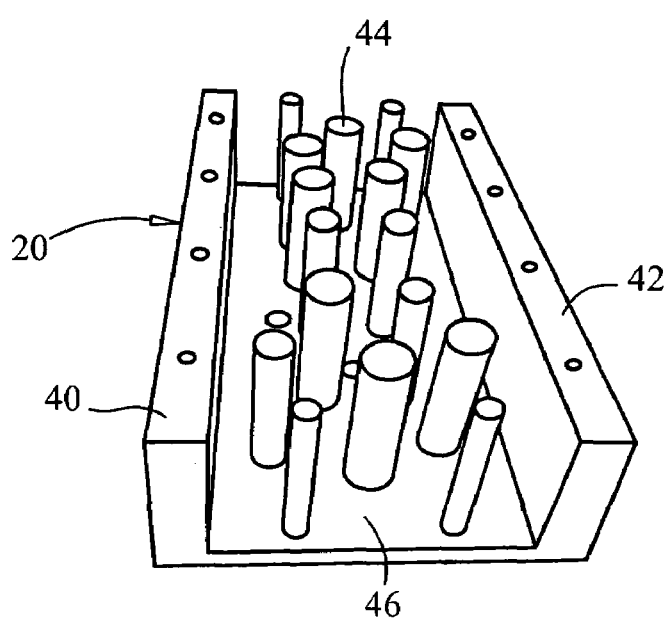
FIG. 4 is a perspective view of the ejector rail assembly portion of the tool assembly which is shown in FIGS. 1 and 2.
Figure 5:
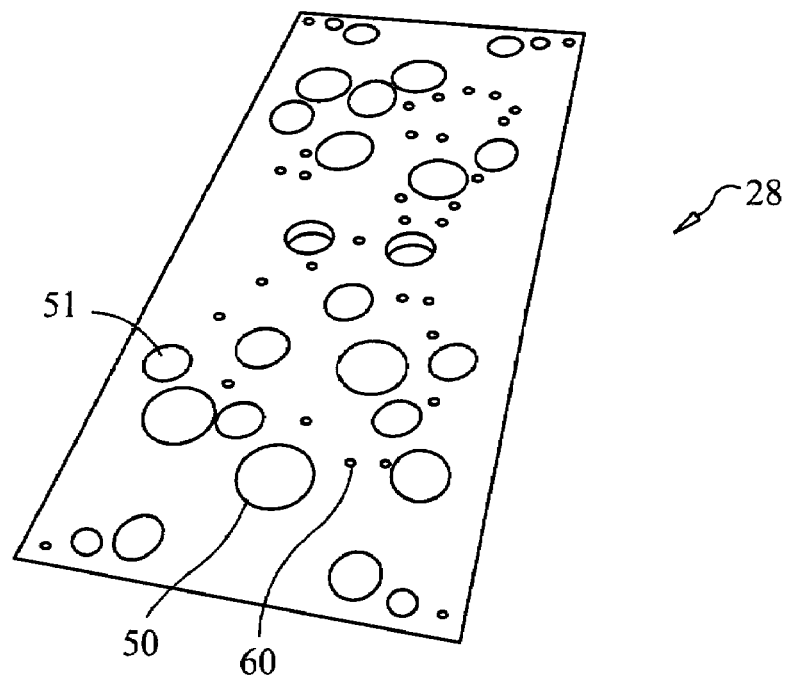
FIG. 5 is a perspective view of the ejector plate assembly portion of the tool assembly which is shown in FIGS. 1 and 2.
Figure 6:
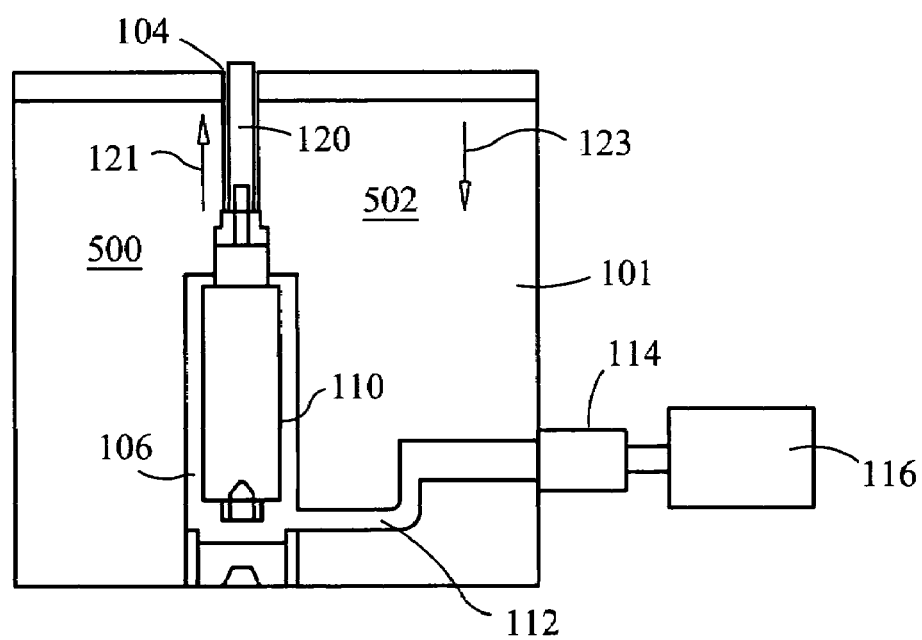
FIG. 6 is a partial side sectional view of a tool which is made in accordance with the teachings of the preferred embodiment of the invention.
Figure 7:
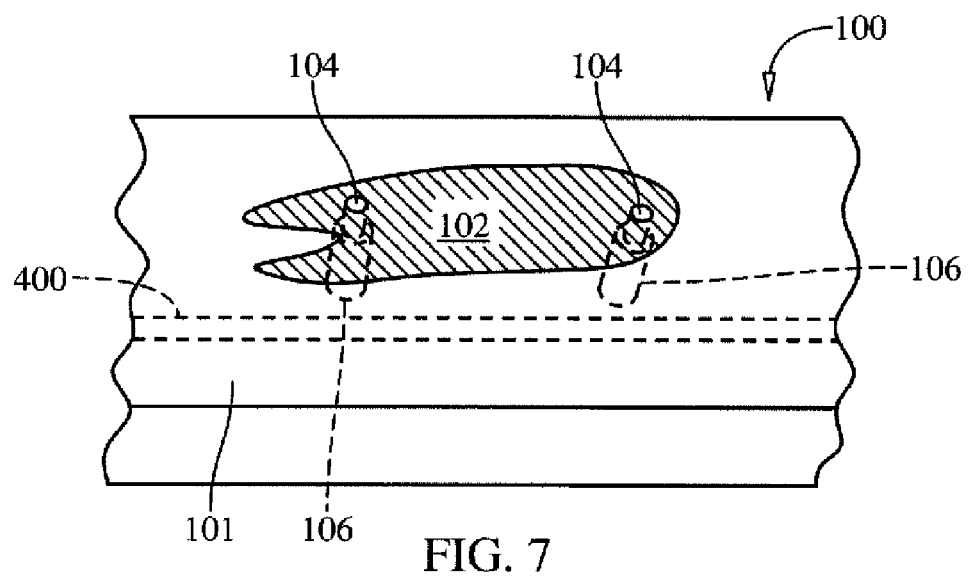
FIG. 7 is a partial perspective view of the tool which is partially shown in FIG. 6.

Particularly, the ejection assembly 14 includes several movable members 18 which are commonly referred to as "ejector pins", several guide pins or members 22, and an ejector pin actuation assembly 19. The ejection assembly 14 further includes a rail and support assembly 20 which is best shown in FIG. 4 and at least one ejector plate 28 which is best shown in FIG. 5. It should be appreciated that various numbers of such ejector pins 18, guide pins 22 and ejector plates 28 may be utilized in alternate embodiments (the ejector plates 28 may be selectively and operatively and vertically stacked), and that while the following discussion relates to the respective items/assemblies 18, 22, and 28 which are shown in FIGS. 1-5, nothing in this description should limit the present inventions to the particular illustrated items/assemblies. Rather, other types of ejection assemblies or object ejector assemblies are conventionally deployed as part of an overall tool assembly and they may be used in a new and novel manner according to the invention.

Particularly, the tool 12 is made to operatively be seated upon the pair of opposed, generally rectangular and substantially identical rails 40, 42 of the assembly 20 and to be engagingly supported by the several protruding guide members 22, each of which has a substantially identical and generally circular cross sectional area. Particularly, assembly includes the support substantially identical rails 40, 42, and protruding members 44 which all terminate upon/within and/or are integrally formed within the base portion 46 of the assembly 20 and abuttingly and supportively traverse plate 28 and assembly 19 to operatively couple the plate 28 and assembly 19 to the portion 46 and operatively position plate 28 and assembly 19 below the tool 12 (shown best in FIGS. 1 and 3). In some alternate embodiments of the invention, the rails 40, 42 and/or the members 44 may be removably coupled or connected to the tool 12 by such members as bolts, screws, and/or other commercially available members/techniques.

Further, as shown in FIGS. 1-5, the at least one ejector plate 28 includes several first orifices 50 which are each adapted in size, shape, and position to respectively receive a unique one of the members 44 and to respectively allow the uniquely received one of the members 44 to traverse the at least one plate 28 before, in some non-limiting embodiments, supportively abutting and/or coupled to the tool 12. Further, the at least one plate 28 includes several second orifices 60 which are each adapted in size, shape, and position to respectively receive a unique one of the ejector pins 18 and to respectively allow the uniquely received one of the ejector pins 18 to traverse the at least one plate 28 and to be selectively extended, in the manner more fully set forth below, to remove an object from the tool 12. The at least one plate 28 further includes third each orifices 51 which are adapted in size, shape, and position to respectively receive a unique one of the guide pins or members 22 and allow these guide pins or members 22 to supportively and abbuttingly engage the tool 12. The at least one plate 28 may be operatively coupled to (or integrally formed with) the actuator assembly 19 and the actuator assembly 19 may rest upon and/or be operatively coupled to the surface 46 by a conventional coupling technique or fastener assembly and/or by the use of members 44. The selectively extendable members or ejector pins 18 movably and extendibly terminate within the actuator assembly 19 and the members 22 also, in one non-limiting embodiment, terminate within the actuator assembly 19. As shown, the guide pins or members 22 and members 44 may be used to couple the ejection assembly 14 (e.g., the at least one plate 28) to the tool 12 and members 44 respectively traverse the actuation assembly 19 before being received by and traverse through the at least one plate 28.

Figure 2:
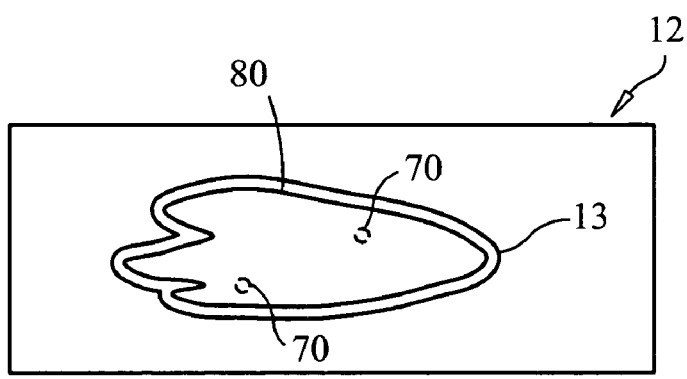
FIG. 2 is a top view of the tool assembly which is shown in FIG. 1.

As shown best in FIG. 2, the forming surface 13 (and/or other part or portion of the tool 12) is made to include several orifices or openings 70 which are respectively registered (i.e., operatively aligned) with a unique one of the ejector pins 18, thereby being respectively adapted to receive the ejector pin 18 to which they are respectively and uniquely aligned with as the ejector pins 18 are selectively extended through the openings 70 to forcible remove the formed object 80 from the tool 10, by the use of actuation assembly 19 in the manner which is more fully delineated below.

Figure 3:
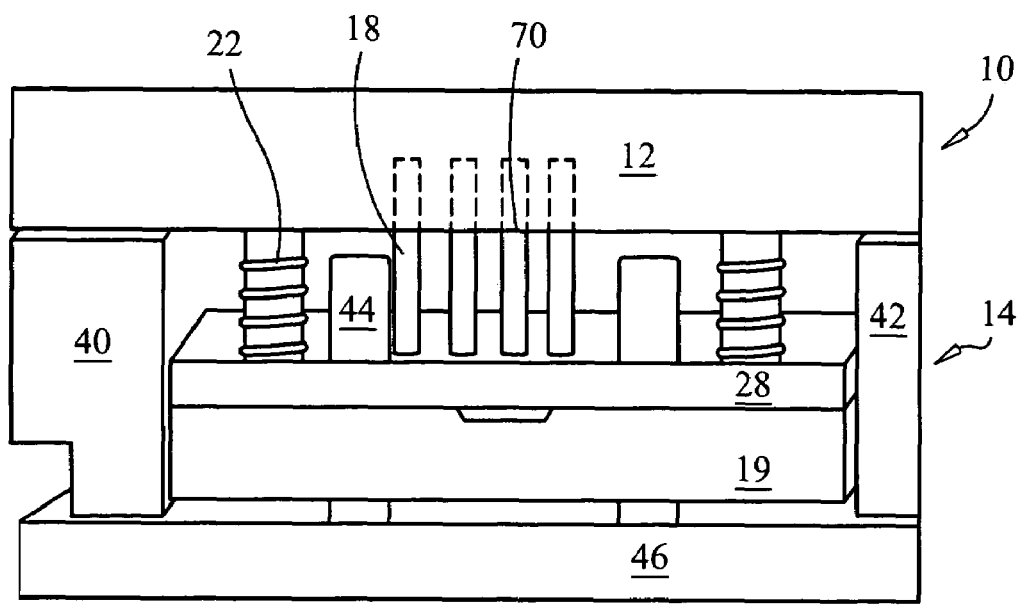
FIG. 3 is a view of the tool assembly which is substantially similar to that shown in FIG. 1, but further illustrating the selective extension of the ejector pins.

Particularly, the actuation assembly 19 may be manifested in a hydraulic, pneumatic, or electronic assembly (or a combination of these assemblies) and is adapted to selectively cause the ejector pins 18 to be moved from a first position in which they are remote from the formed object 80 to a second position in which the guide pins 18 respectively extend through a unique one of the openings 70 and thereafter forcibly and removably engaging the formed object 80 (see, for example, FIG. 3). In the electronic embodiment, the assembly 19 may comprise several selectively energizable relay assemblies, each of which is operatively coupled to a unique one of the ejector pins 18. When the relays are energized (receive electrical power), they respectively "push" the pin 18 to which they are respectively coupled through a unique one of the openings 70, effective to cause the ejector pins 18 to cooperatively contact the formed object 80 and force the formed object 80 from the forming surface 13. When electrical energy is removed from the relays, the relays cause the ejector pins 18 to be retracted from the openings 70 and into the assembly 19. In the other embodiments (hydraulic and pneumatic), some desired liquified medium and gas are respectively sourced into the assembly 19 and used to push the ejector pins 18 through the openings 70 into forced engagement with the formed object 80. After the liquid or gas is removed from the assembly 19 (i.e. communicated back to the source), these ejector pins 18 are returned back to their first position. In one non-limiting embodiment, the ejector pins 18 are fixed within the at least one ejector plate 28 and when it is desired to cause these pins 18 to be passed through the openings 70, a liquid medium or gas is forced against the at least one ejector plate 28, thereby forcing the at least one ejector plate 28 in a substantial axial direction away from the portion or surface 46 and toward the tool 12 (see, for example, FIG. 1). Other embodiments may be utilized.

Applicant has discovered that this and other prior art ejection strategies may be greatly-improved, without appreciably modifying the prior art type of ejection assembly 14, by causing the ejector pins 18 to vibratorally engage the formed tangible object 80, thereby efficiently causing the formed object 80 to be removed from the tool 10 while minimizing or significantly reducing the likelihood of damage to the formed object 80. Such vibrational engagement may be accomplished by "pulsing" the air, or other medium which is used to selectively extend the ejector pins 18. This pulsing means that the pressure of the medium is rapidly increased and decreased, but not decreased to a level in which the ejector pins 18 actually retract toward surface 46. This rapid change in medium pressure causes the ejector pins 18 to vibratorally engage the formed object 80 and Applicant has found that such vibratory engagement causes the formed object to be efficiently removed from the tool 12, while dramatically reducing the overall likelihood that damage will be done to the formed object 80. Such pulsing may be achieved, by way of example and without limitation, by the use of a valve which is physically and communicatively coupled to the medium and to the assembly 19 and which may have the diameter of its orifice, through which the medium travels before entering assembly 19 and being communicated to the ejector pins 18, rapidly modified electronically (by a computer) or manually and rapidly adjusted. With respect to the electronic embodiment of actuator 19, such pulsing may be achieved by very rapidly energizing and reenergizing the relays by use of a computer under program control or manually by rapidly turning "on" and "off" the power to the assembly 19.

To understand further improvements upon the foregoing strategy, reference is now made to FIGS. 6-9, in which a laminated tool 100 (comprised of a contiguous mass of material 101, such as steel, aluminum, and/or copper which is formed by a section by section "build up" in the manner set forth in The '742 patent) is shown having a forming surface 102 with at least one ejection type space 106.

Particularly, the at least one opening or space 106 extends from the interior of the mass 101 and terminates into or forms the opening 104. In one non-limiting embodiment, a selectively movable or extendable member, such as a cylinder 110, is operatively disposed within this space 106 and the space 106 is made to communicates with a channel 112 which terminates into a valve 114. Connected to the valve 114 is a source of air or another selectively communicatable or flowable medium 116.

In operation, when it is desired to eject a part or a previously formed object from the tool 100, air (or another flowable medium) is sourced from the source 116, through the valve 114, and is communicated to the cylinder 110 by use of the channel 112. The communicated air forces the cylinder 106 (i.e., the shaft 120 of the cylinder 106) to be moved in a direction 121 toward and through the opening 104, thereby ejecting the formed part or object from the tool 100. When the object has been ejected, the communicated air may be vented from the space 106, through the channel 112 and the valve 114, thereby causing the shaft 120 to be retracted from the opening 104, in direction 123. The supplied air may even be selectively pulsated in order to allow the shaft 120 to be vibrated as it engages the formed part or object (e.g., the valve 114 may be rapidly opened or closed by a computer or manually). In one embodiment, the valve 114 includes a computer which, upon receipt of a signal, causes such pulsation to occur.

Figure 8:
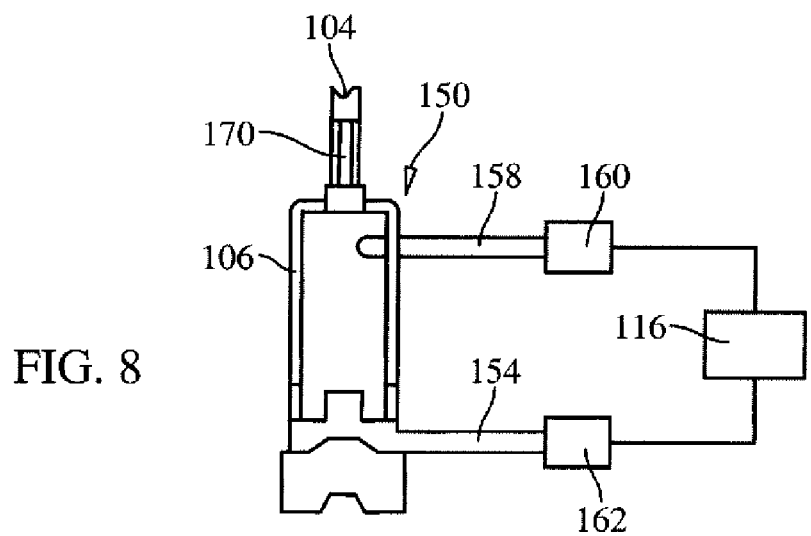
FIG. 8 is a partial side sectional view of a tool which is made in accordance with the teachings of an alternate embodiment of the invention.

In an alternate embodiment of the invention, as is best shown in FIG. 8, a dual acting cylinder 150 may be utilized. That is, in this alternate embodiment of the invention, the dual acting cylinder 150 is communicatively coupled to the source of air 116 by the use of two separate channels 154, 158. Each channel 154, 158 is respectively and operatively coupled to a unique one of the valves 160, 162 and each valve is operatively coupled to the source of air 116.

Particularly, when it is desired to cause the shaft 170 to extend through the opening 104, air is sourced through the valve 162 and enters channel 154. When it is desired to retract the shaft 170 from the opening 104, the previously received air is vented, through the channel 154 and valve 162 and air is positively sourced from the source 116, through the valve 160 and the channel 158, to forcibly retract the shaft 170 from the opening 104. The sourced air, necessary to extend the shaft 170, may be pulsated, thereby causing the shaft 170 to vibratorally engage the formed part or object. Such pulsation may be effectuated by rapidly opening and closing the valve 162 and valve 162, in one embodiment, may include a controller to allow this to selectively occur.

Figure 9:
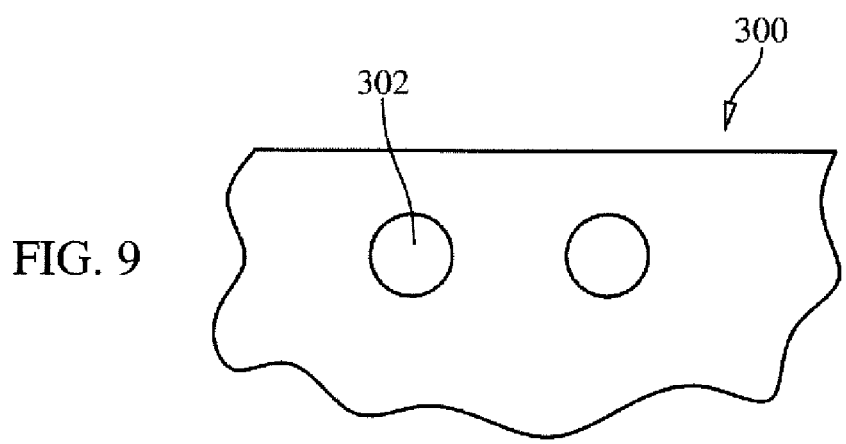
FIG. 9 is a side view of a sectional member used to create the tool which is shown, for example, in FIG. 7.

It should be appreciated that the tool 100 may, as was discussed above, comprise a laminated tool which is made from various sections, such as section 300 which is shown in FIG. 9 and which may be made from steel, copper, and/or aluminum materials. Further, some of the sections, such as section 300, may respectively include at least one opening, such as opening 302, and when these sections, such as section 300, are selectively coupled to form the tool 100, some of these formed openings, such as opening 302, may be registered, thereby forming at least one passageway, such as passageway 400 within the formed tool 100. These passageways, such as passageway 400, may be selectively uses a cooling and/or heating passageways.

Thus, it should be appreciated that the lamination technique allows the space 106 may be easily formed by determining the need for such a space and placing it into the software model used to create the various sections, such as section 300. The individual sections are created to form this space. For example, the space 106 may be formed between two adjacent sections 500,502 which are spatially configured to form this space 106 when the sections 500, 502 are coupled and channel 112 may also be quite easily placed within the section 502 and made to communicate with the space 106 by forming an opening, such as opening 302, within the section 502.

It should be appreciated that the cylinders 110,150 may be replaced with a member, having any substantially desired shape, and which is adapted to movably reside within the formed space 106 and to selectively move within the space 106 in the foregoing manner (i.e. to selectively be forcibly extended through the tool 100 and to selectively retract within the space 106). Thus, the movable member, such as cylinders 110, 150 or other type of member is integrally formed or integrally resides within the tool 100 (e.g., within the contiguous mass 101 in which the forming surface 102 is made to exist), thereby obviating the need for a separate tool and a separate ejection assembly and providing a very uncomplicated ejection strategy which obviates the need for several ejection pins 18 and the remaining portions of the ejection assembly 14. Thus, the present invention overcomes the previously delineated drawbacks of prior tool ejection strategies and techniques. It should be appreciated that several such movable members (e.g., the foregoing cylinders 110, 150 or a non-cylinder which may be collectively referred to as "movable members") may be utilized within the tool 100 and operatively housed within separate spaces, similar to space 106. Thus, in this manner, the number of such movable members may be easily fixed and modified during the design of the tool 100, there is a major reduction in overall tool formation cost and expenditures, a large increase in overall reliability, a dramatic decrease in needed preventative maintenance and repair due to the uncomplicated nature of the strategy, a decrease or elimination of damage done to the tool caused by the side loads which are normally imparted by the at least one ejector plate 28, and the ability to allow the member to vibratorally engage the part or formed object.

It is to be understood that the invention is not limited to the exact construction and method which has been delineated above, but that various changes and modifications may be made without departing from the spirit and the scope of the inventions as are more fully delineated in the following claims.

What is claimed is:

1. A laminated tool assembly for forming an object, the tool assembly comprising:
    a plurality of generally planar modeled sectional members coupled to cooperatively form a laminated tool and provide only one forming surface for forming an object, the sectional members having a plurality of housing spaces formed after coupling; and
    a plurality of integrally formed ejection assemblies, each disposed within one of the housing spaces for ejecting the formed part from the tool.

2. The tool assembly of claim 1 wherein said ejection assembly further comprises at least one cylinder.

3. A laminated tool comprising:
    a contiguous mass of material formed from the selective coupling of a plurality of sectional members having only one object forming surface therein; and
    a plurality of ejection members which are movably and operatively disposed within said contiguous mass of material and which are adapted to selectively and independently move within said contiguous mass of material from a first position which is remote from said object forming surface to a position through said object forming surface.

4. The tool of claim 3 wherein each of said sectional members is formed from a substantially identical material.

5. The tool of claim 4 wherein said substantially identical material comprises steel.

6. The tool of claim 3 wherein said at least one of the plurality of ejection members further comprises a cylinder.

7. The tool of claim 3 wherein at least one ejection member further comprises a dual acting cylinder.

8. The tool of claim 3 wherein at least one ejection member further comprises a single acting cylinder.

9. The tool of claim 4 wherein said substantially identical material comprises copper.

10. The tool of claim 4 wherein said substantially identical material comprises aluminum.

11. A laminate tool assembly comprising:
    a plurality of sectional members coupled together to form a tool, the tool having a forming surface for forming an object;
    an object ejector assembly; and
    a vibration assembly which is operatively coupled to the object ejector assembly and which causes the object ejector assembly to vibrate, effective to remove the object from the tool.

12. The tool assembly of claim 11 wherein said laminate tool further comprises an object forming surface; and
    wherein the object ejector assembly further comprises:
        a plurality of ejector pins, and
        a pneumatic assembly which selectively causes at least some of said ejector pins to vibratorally and selectively extend through said object forming surface, effective to remove said object from said tool.

13. The tool assembly of claim 11 wherein said laminate tool further comprises an object forming surface; and
    wherein said object ejector assembly further comprises:
        a plurality of ejector pins, and
        a hydraulic assembly which selectively causes at least some of said ejector pins to vibratorally and selectively extend through said object forming surface, effective to remove said object from said tool.

14. The tool assembly of claim 11 wherein said laminate tool further comprises an object forming surface; and
    wherein said object ejector assembly further comprises:
        a plurality of ejector pins, and
        an electronic assembly which selectively causes at least some of said ejector pins to vibratorally and selectively extend though said object forming surface, effective to remove said object from said tool.

15. A method of forming a laminate tool from sheet material comprising the steps of:
    modeling with software an intangible design of said laminate tool having a forming surface and a plurality of housing spaces;
    using said intangible design to create a plurality of sectional members that collectively provide the laminated tool with the plurality of housing spaces when joined;

coupling said sectional members, effective to form a laminated tool having said forming surface and the housing spaces within the laminate tool; and operatively placing a plurality of selectively movable members in the plurality of housing spaces, the movable members being adapted to be selectively and retractably moved through said forming surface.

16. The method of claim 15 wherein said selectively movable member further comprises a single acting cylinder.

17. The method of claim 15 wherein said selectively movable member further comprises a dual acting cylinder.

18. A method of ejecting a formed object from a laminated tool comprising the steps of:

placing a plurality of movable members within said tool; and selectively and individually vibrating said movable members as said movable members contact said formed object, thereby ejecting said formed object from said tool.

19. The method of claim 18 wherein said movable member further comprises a single acting cylinder.

20. The method of claim 18 wherein said movable member further comprises a dual acting cylinder.

21. The method of claim 18 wherein said movable members are vibrated by the use of pulsed air.

22. The method of claim 18 wherein said movable members are vibrated by the use of pulsed water.

23. The method of claim 18 wherein said movable members are vibrated by the use of a pulsed electrical signal.

24. The method of claim 18 further comprising forming the object from the tool.

25. A laminated tool assembly comprising:

a plurality of sectional members coupled to cooperatively form a laminated tool and create a forming surface to form an object, the sectional members having a plurality of ejection type spaces and a plurality of channels formed after coupling, each ejection type space extending from the interior of the tool to form an opening at the tool surface, and each of the channels communicating with one of the ejection type spaces;

a plurality of valves each in fluid communication with a source of fluid and one of the plurality of channels; and a plurality of integrally formed ejection assemblies having a plurality of selectively movable members disposed within the corresponding ejection type spaces of the laminated tool, and each movable member being selectively and individually extendable through the opening at the tool surface to eject a formed part from the tool.

26. The laminated tool assembly of claim 25 wherein each valve controls fluid flow through the corresponding channel and into the ejection type space, forcing the corresponding movable member to be moved in a direction towards and through the corresponding opening for the movable member at the tool surface, such that selective and controlled movement of only some of the movable members to an ejection position with other movable members retracted ejects a portion of the formed part from the tool.

27. The laminated tool assembly of claim 25 wherein the fluid is pulsated to vibrate the movable member as it engages the formed part.

* * * * *